US012618493B2

(12) United States Patent　(10) Patent No.:　US 12,618,493 B2
Anderson　(45) Date of Patent:　May 5, 2026

(54) MODULAR SUPPORT SYSTEM AND CLAMP

(71) Applicant: ERICO International Corporation, Solon, OH (US)

(72) Inventor: Scott Ernest Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 62 days.

(21) Appl. No.: 18/499,836

(22) Filed: Nov. 1, 2023

(65) Prior Publication Data

US 2024/0151328 A1　May 9, 2024

Related U.S. Application Data

(60) Provisional application No. 63/382,876, filed on Nov. 8, 2022.

(51) Int. Cl.
*F16M 13/00*　(2006.01)
*F16L 3/24*　(2006.01)
*F16M 13/02*　(2006.01)

(52) U.S. Cl.
CPC ............. *F16L 3/243* (2019.08); *F16M 13/02* (2013.01)

(58) Field of Classification Search
CPC ......... F16L 3/243; F16M 13/02; F16M 11/22; F16M 2200/08; F16B 7/0486; F16B 2/065; F16B 7/0426; F24F 13/32; B66F 3/10
See application file for complete search history.

(56) References Cited

U.S. PATENT DOCUMENTS

| | | | |
|---|---|---|---|
| 4,660,799 A | 4/1987 | Butland | |
| 4,728,235 A | 3/1988 | Patti | |
| 4,937,989 A * | 7/1990 | Miyares | B66F 7/14 |
| | | | 254/43 |
| 4,989,826 A | 2/1991 | Johnston, Jr. | |
| 5,067,685 A | 11/1991 | Johnston, Jr. | |
| 5,308,037 A | 5/1994 | Gonzalez | |
| 5,407,171 A | 4/1995 | Gonzalez | |
| 5,509,237 A * | 4/1996 | Coulter | B60P 3/36 |
| | | | 52/126.6 |

(Continued)

FOREIGN PATENT DOCUMENTS

| | | |
|---|---|---|
| AU | 2013205661 B2 | 11/2013 |
| CN | 2742332 Y | 11/2005 |

(Continued)

OTHER PUBLICATIONS

Rectorseal HVAC installation Solutions, Mounting Solutions & Accessories brochure, RectorSeal, year unknown, 7 pages.

*Primary Examiner* — Amy J. Sterling
(74) *Attorney, Agent, or Firm* — Quarles & Brady LLP

(57)　ABSTRACT

A rooftop support system can include a base to support the rooftop support structure on a rooftop, and a post secured to and extending upwardly from the base. The rooftop support system can further include a clamp secured to the post to be supported by the post relative to the base. The clamp can include a first wall, a second wall extending from the first wall, and a third wall extending from the second wall, so that the first, second, and third walls at least partly define an interior volume of the clamp. A tab can extend from the third wall at least partly toward the first wall to further define the interior volume.

20 Claims, 12 Drawing Sheets

(56) References Cited

U.S. PATENT DOCUMENTS

| | | | |
|---|---|---|---|
| 5,603,187 A * | 2/1997 | Merrin | F24S 25/61 |
| | | | 52/90.2 |
| 5,820,092 A | 10/1998 | Thaler | |
| 6,663,070 B2 | 12/2003 | Valentz et al. | |
| 6,772,564 B2 | 8/2004 | Leon | |
| 6,863,253 B2 | 3/2005 | Valentz et al. | |
| 8,701,261 B2 | 4/2014 | Crowley | |
| 8,827,232 B2 | 9/2014 | Crowley | |
| 9,010,553 B2 | 4/2015 | Crowley | |
| 9,103,486 B2 | 8/2015 | Crowley | |
| 9,121,545 B2 | 9/2015 | Stanley | |
| 9,185,971 B2 | 11/2015 | Crowley | |
| 9,188,273 B2 | 11/2015 | Merhar et al. | |
| 9,226,575 B2 | 1/2016 | Crowley | |
| 9,228,756 B2 | 1/2016 | Crowley | |
| 10,359,212 B2 | 7/2019 | Darby | |
| 10,378,609 B2 | 8/2019 | Threadgold et al. | |
| D884,461 S | 5/2020 | Allen et al. | |
| 10,962,255 B2 | 3/2021 | Crowley | |
| 11,156,381 B2 | 10/2021 | Baljekar et al. | |
| 11,229,820 B2 | 1/2022 | Kimura | |
| 11,367,198 B2 | 6/2022 | Tadi et al. | |
| 11,549,639 B2 | 1/2023 | Georgeau | |
| 2007/0176059 A1 * | 8/2007 | Roscetti | F16B 2/065 |
| | | | 248/122.1 |
| 2012/0073237 A1 * | 3/2012 | Brown | F24F 13/32 |
| | | | 248/65 |
| 2014/0252195 A1 | 9/2014 | Maresca | |
| 2021/0293450 A1 | 9/2021 | Cappellari | |
| 2022/0079335 A1 | 3/2022 | Alexander et al. | |
| 2022/0329202 A1 | 10/2022 | Boguess | |

FOREIGN PATENT DOCUMENTS

| | | | |
|---|---|---|---|
| CN | 200965335 | Y | 10/2007 |
| CN | 212839135 | U | 3/2021 |
| CN | 114413349 | A | 4/2022 |
| CN | 216203872 | U | 4/2022 |
| EP | 1455132 | A1 | 9/2001 |
| EP | 1167887 | B1 | 12/2004 |
| EP | 1657085 | B1 | 11/2011 |
| EP | 2461114 | A1 | 6/2012 |
| EP | 3444518 | A1 | 2/2019 |
| GB | 2546956 | B | 1/2018 |
| GB | 2548909 | B | 3/2018 |
| JP | H09-236287 | A | 9/1997 |
| JP | 2768641 | B2 | 6/1998 |
| JP | 2913616 | B2 | 6/1999 |
| JP | 2002-089888 | A | 3/2002 |
| JP | 2002-221342 | A | 8/2002 |
| JP | 2005-299953 | A | 10/2005 |
| JP | 2007-064537 | A | 3/2007 |
| JP | 2008-69810 | A | 3/2008 |
| JP | 4205653 | B2 | 1/2009 |
| JP | 4244369 | B2 | 3/2009 |
| JP | 2009-168287 | A | 7/2009 |
| JP | 4293448 | B2 | 7/2009 |
| JP | 4293449 | B2 | 7/2009 |
| JP | 4425685 | B2 | 3/2010 |
| JP | 4425686 | B2 | 3/2010 |
| JP | 4490489 | B2 | 6/2010 |
| JP | 4927068 | B2 | 5/2012 |
| JP | 6650168 | B2 | 2/2020 |
| JP | 2020-056464 | A | 4/2020 |
| JP | 6706603 | B2 | 6/2020 |
| KR | 10-1708000 | B1 | 2/2017 |
| KR | 10-1726423 | B1 | 4/2017 |
| WO | 2015/089558 | A1 | 6/2015 |

* cited by examiner

108

136

144          140

120

MODULAR SUPPORT SYSTEM AND CLAMP

CROSS-REFERENCE TO RELATED APPLICATIONS

This application claims priority under 35 U.S.C. 119 from U.S. Provisional Application No. 63/382,876, filed Nov. 8, 2022, titled "Modular Support System and Clamp," and is incorporated herein by reference in its entirety.

BACKGROUND

In many applications, it may be useful to support equipment of various types (e.g., an air conditioning unit) on a rooftop, in a building, or on a ground surface.

SUMMARY

In some examples, the disclosed technology provides a rooftop support system that includes a rooftop support structure. The rooftop support structure may include a base configured to support the rooftop support structure on a rooftop, a post secured to and extending upwardly from the base, and a clamp secured to the post to be supported by the post relative to the base. In some embodiments, the clamp may include a first wall, a second wall extending from the first wall, and a third wall extending from the second wall, so that the first, second, and third walls partly define an interior volume of the clamp to receive a support beam. The clamp may further include a tab extending from the third wall at least partly toward the first wall to further define the interior volume and retain the support beam within the interior volume.

In some examples, the disclosed technology provides a rooftop support system having a first rooftop support structure that may include a first clamp with a first inwardly extending tab. The system may further include a second rooftop support structure that includes a second clamp with a second inwardly extending tab. The system may also include a first beam that may be received within and supported by the first clamp, and a second beam that may be received within and supported by the second clamp. The system may further include a crossbeam assembly. The crossbeam assembly may include a crossbeam with a first end and a second end opposite from the first end in an elongate direction of the beam, the crossbeam being received and supported within the first and second clamps. The crossbeam assembly may further include a first crossbeam clamp secured to the first end of the crossbeam, and a second crossbeam clamp secured to the second end of the crossbeam. Each of the first crossbeam clamp and the second crossbeam clamp may include a first wall, a second wall extending from the first wall, and a third wall extending from the second wall, so that the first, second, and third walls partly define an interior volume of the first or second clamp, respectively. The first and second crossbeam clamp may also each include a tab extending from the third wall at least partly toward the first wall, and past the first wall in a direction away from the second wall, to further define the interior volume.

In some examples, the disclosed technology provides a method of installing a rooftop support system. The method may include installing a rooftop support structure, including by installing a base on a roof top with a post secured to and extending upwardly from the base and with a clamp secured to the post to be supported by the post relative to the base. The method may further include installing a beam into the interior volume of the clamp that is defined by a first wall, a second wall extending from the first wall, a third wall extending from the second wall, and a tab extending from the third wall at least partly toward the first wall. The method may also include adjusting a fastener on the clamp so that the fastener and the tab retain the beam within the interior volume.

In some examples, the disclosed technology provides a clamp for a rooftop support system. The clamp may include a first wall, a second wall extending from the first wall, and a third wall extending from the second wall, so that the first, second, and third walls at least partly define an interior volume of the clamp. The clamp may further include a tab that, may extend from the third wall at least partly toward the first wall to further define the interior volume, or may extend from third wall to define a reduced-clearance entrance region of the interior volume.

In some examples, the disclosed technology provides a modular support system. The modular support system may include a plurality of clamps that are substantially identical. Each clamp of the plurality of clamps may include a U-shaped cross-sectional profile that partly defines an interior volume, a tab extending from a side wall of the U-shaped cross-sectional profile to define entrance region into the interior volume, and a threaded fastener threadedly secured to the clamp to be adjustably extendable into the interior volume. The modular support system may further include a plurality of cross-members. Each cross-member of the plurality of cross-members may have a cross-sectional profile perpendicular to an elongate direction of the cross-member, the cross-sectional profile being sized to be received through the entrance region in the interior volume of any of the plurality of clamps to be secured against removal by the threaded fastener and the tab.

BRIEF DESCRIPTING OF THE DRAWINGS

The accompanying drawings, which are incorporated in and form a part of this specification, illustrate embodiments of the invention and, together with the description, serve to explain the principles of embodiments of the invention:

DETAILED DESCRIPTION

Figure 1:
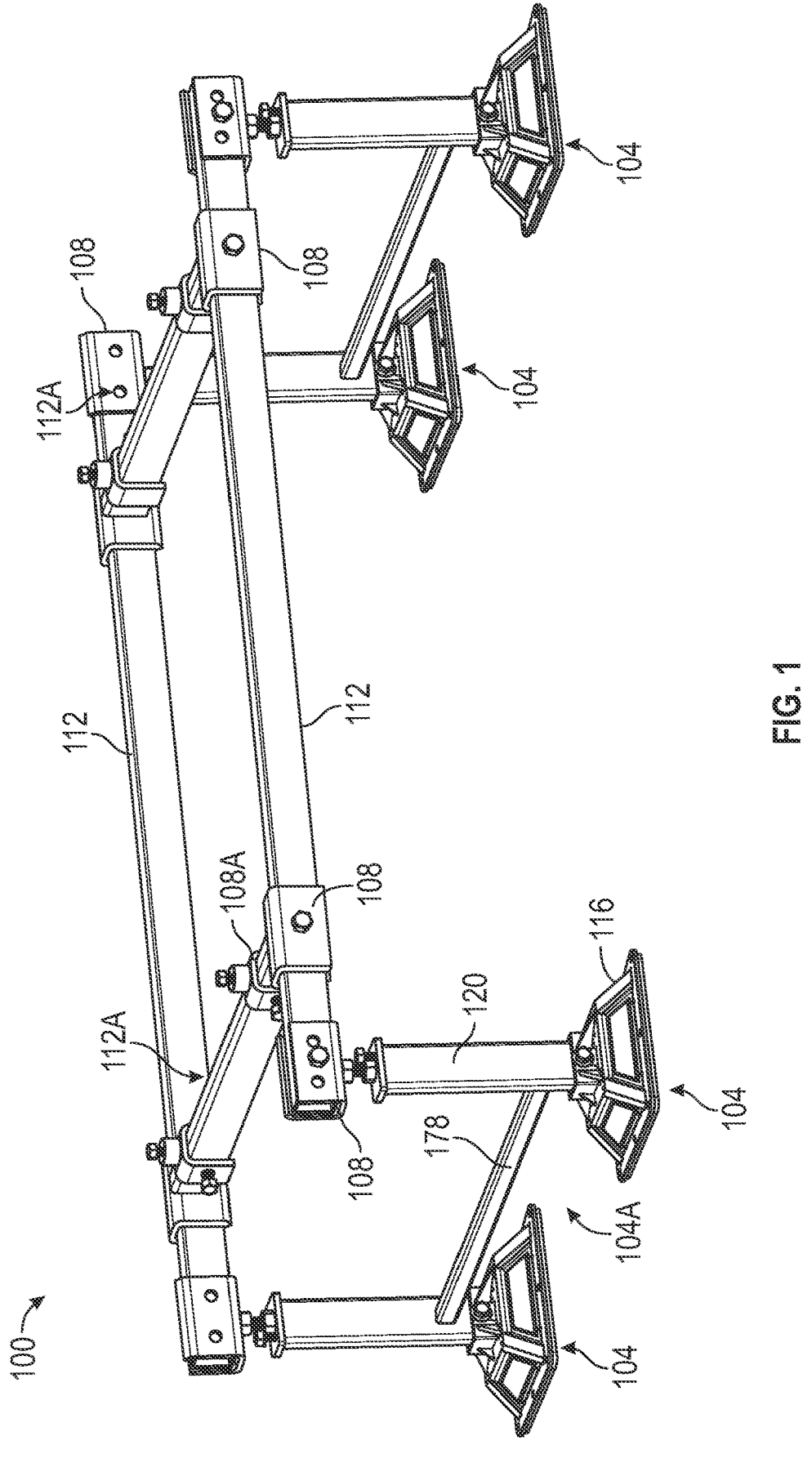
FIG. 1 is a perspective view of a modular rooftop support system including a equipment support frame with modular rooftop support structures and modular clamp assemblies according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to elevate equipment above the ground (e.g., for an air conditioning unit, heat exchanger, electrical enclosure, pump, generator, solar panel, solar inverter, etc.). Elevating the equipment above a support surface may aid in air flow for the unit and may help to prevent rapid build-up of particles, such as dirt and snow, on the unit. Currently available support structures for rooftop air conditioning units require a lengthy assembly time and are not readily customizable, e.g., require permanent fasteners for each component coupling, with corresponding increases in install time and the required number of components. Currently available support structures may in some cases have only a single support configuration and may be capable of being coupled to only one type or brand of air conditioning unit.

Embodiments of the present invention may address these and other issues, including as can cut down the installation time for equipment support systems, including rooftop support systems to elevate equipment above a rooftop surface. For example, through the use of readily adaptable modular clamps and related components, some embodiments can reduce the number of components needed for a support structure as compared to conventional designs.

Further, some embodiments can provide clamp structures with improved ease of installation and robustness in service.

For example, some modular support systems can be based on interconnected beams as secured by U-shaped connectors on the ends of various support posts and beams (e.g., at opposing ends of crossbeam assemblies) to allow an installer to quickly assemble pieces of the structure together into a customized final structure (e.g., through relatively simple drop and slide installation of beams into clamps). In some cases, a U-shaped connector design may also allow an installer to quickly slide (or otherwise align) staged or previously installed beams or other support members into different configurations. This can also allow for easier customization of the support structure, including to adapt (e.g., expand) support structures that are already in service.

Some embodiments of the present invention can also allow a height of the support structure to be quickly changed (e.g., to provide a different height of an air conditioning unit), including via telescoping rods. Thus, for example, some embodiments can be readily adjustable to account for different height regulations regarding support structures for air conditioning units or other equipment, accommodate other rooftop structures, or address various other considerations for installation and service.

In some embodiments, a support structure includes a base, a post extending upward from the base, a telescoping rod threadedly coupled to the post, and a clamp coupled to the telescoping rod. In some configurations the clamp is configured to receive and support an elongate support member (e.g., a rectangular beam) of a larger support system. An elongate member may be supported by multiple support structures in some cases. In some cases, as further discussed below, multiple elongate members may be supported by a single clamp.

In some arrangements, a support assembly may include a first clamp and a second clamp coupled to a support beam (e.g., a rectangular beam) or other elongate support member. For example, clamps can be welded or otherwise secured (e.g., bolted) at opposing ends of a beam to provide a crossbeam assembly that can be readily installed to bridge a gap between opposing support beams (e.g., as each supported on clamps of a telescoping rooftop support structure). In some examples, a crossbeam or other clamp assembly can be configured to support one or more air conditioning units or other equipment. In some examples, modular clamps can be coupled in various configurations to the bottom of an air conditioning unit directly or indirectly (e.g., as part of a cross-beam assembly). Such an air conditioning unit, or other equipment similarly supported, can then be readily installed onto an existing support structure via sliding engagement of the clamps.

In some configurations, multiple substantially similar clamps can be used on support structures or crossbeam assemblies of a support system or to attach various equipment thereto. In some cases, the clamps may be U-shaped, to define an interior volume of the clamp that is sized to receive an elongate support member (e.g., a beam with a rectangular or other elongate cross-section). In some configurations, a tab may extend from one side wall of a clamp at least partly toward an opposing side wall of the clamp (e.g., extending at an oblique angle relative to the opposing side wall). In some examples, a tab may extend from a distal end of a side wall of the clamp to correspondingly extend a perimeter of the interior volume beyond the side wall and provide a reduced-clearance entrance region into the interior volume.

In some configurations, a clamp can further include a locking mechanism to secure a support member within the interior volume, in cooperation with the tab. For example, a threaded fastener may be threadedly received into a threaded opening in one of the side walls (or otherwise) to clamp a beam against the other side wall. Thus, for example, the threaded fastener limits movement of the beam, in cooperation with the tab, to retain the beam within the interior volume of the clamp. In some configurations, the U-shaped clamps may include aligned openings, that can receive corresponding fasteners to secure multiple support members to the same clamp.

As one example, FIG. 1 illustrates a modular rooftop support system 100 for supporting equipment, including as can be installed on flat rooftops, interior or exterior concrete decks, or on other support surfaces. In the example shown, the support system 100 includes a plurality of adjustable rooftop support structures 104, a plurality of clamps 108, and a plurality of beams 112 including as part of crossbeam sub-assemblies 112A. As further detailed below, the clamps 108 can be easily installed and adjusted to desired locations, so that various beams of a standard size can be held together and to relevant equipment (not shown in FIG. 1) to be supported by the support system 100.

In different examples, different support structures can be used, including as can be configured in various new ways to reliably support a load relative to a rooftop or other support surface. In the illustrated example, each support structure 104 includes a base 116, a post 120, and one of the clamps 108. In other examples, other configurations are possible (e.g., with only the base 116 and the clamp 108, with a different base, with a different post or other vertical support assembly, etc.).

Figure 2:
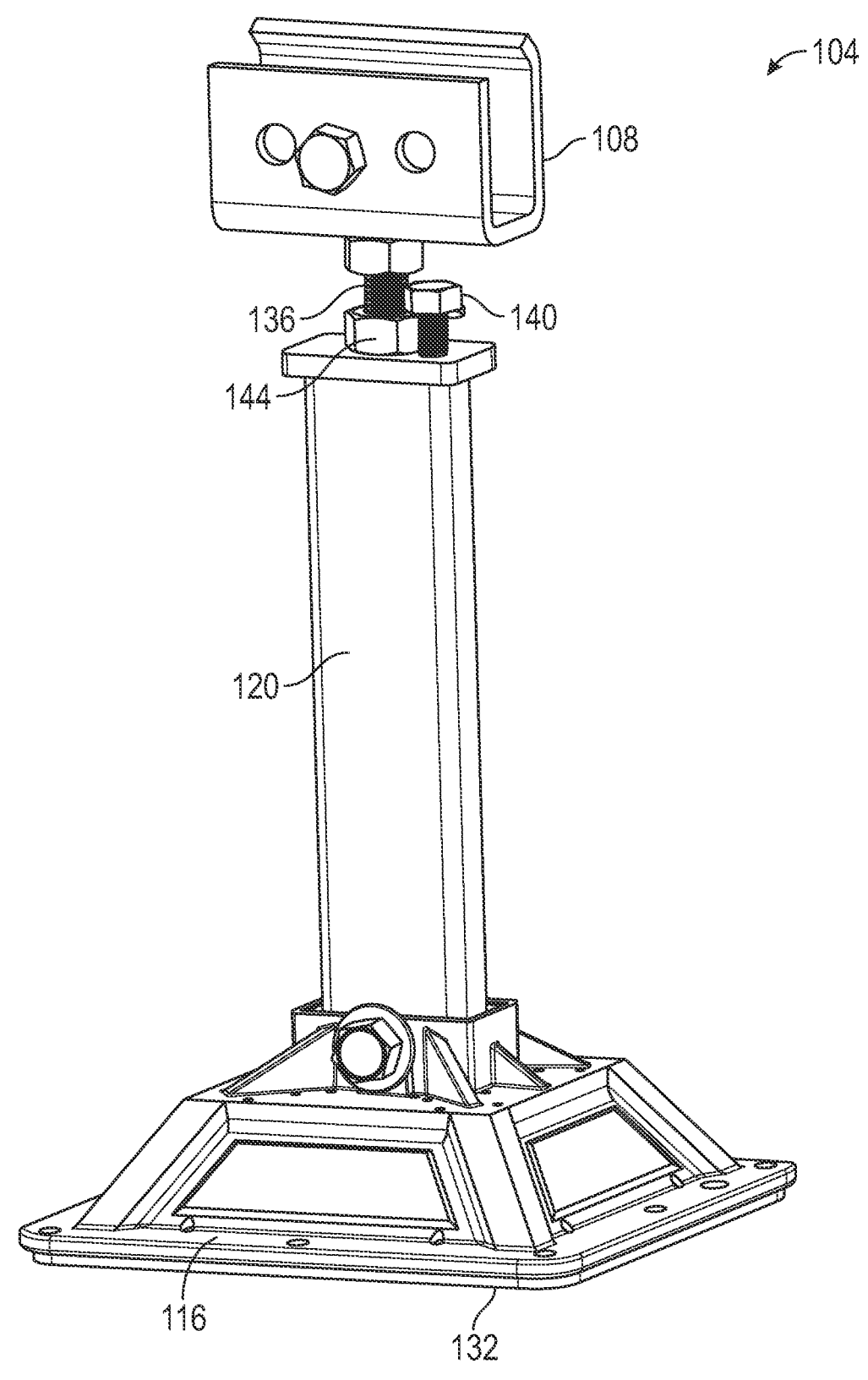
FIG. 2 is a perspective view of one of the rooftop support structures of the modular rooftop support system of FIG. 1.

FIG. 2 illustrates an example configuration of one of the support structures 104 of the support system 100 of FIG. 1. As illustrated, the support structure 104 includes a foam pad 132, the base 116, the post 120, a telescoping rod 136, a locking fastener 140, and one of the clamps 108.

The foam pad 132 extends from the bottom of the base 116 to provide a seating portion of the base 116. The foam pad 132 may help protect a surface that the support system 100 rests upon and may beneficially increase friction between the support structure 104 and the surface, but may not be included in some examples.

A base for a support structure can generally exhibit a variety of shapes, including generally tapered shapes that provide a wider bottom portion for stability. For example, as illustrated, the base 116 forms a pyramidal shape. In particular, the pyramidal shape includes a square bottom, and four trapezoidal faces that extend from the square bottom toward a square flat-topped surface. The vertical cross-section of the base 116 as illustrated is therefore trapezoidal. In other configurations, the base 116 may have a different shape (e.g. cube, cylindrical, cuboid, or tetrahedral).

As illustrated in FIG. 2, the post 120, extends upward from the base 116. Correspondingly, for example, the top pyramidal surface can include a base aperture configured to receive the post 120, and a post fastener to secure the post 120. The illustrated post 120 is a rounded rectangular tube (a rectangular tube with rounded edges). Correspondingly, as illustrated the base aperture is configured to receive the rounded-corner rectangular post 120. In other configurations, the base aperture may be configured to receive a post having a different cross-sectional profile (e.g. otherwise oblong, ovular, circular, square, etc.).

In some examples, a support structure can provide adjustable height for one of the clamps 108. Thus, different adjusting (e.g., sliding) or locking mechanisms can be included in different embodiments. Thus, for example, the support structure 104 can be a telescoping structure in some cases. In particular, in the illustrated example of FIGS. 2 and 3, the post 120 is capped by an upper plate with two apertures. A first plate aperture is sized to slidingly receive the telescoping rod 136. A second plate aperture is configured to threadedly receive the locking fastener 140.

Figure 3:
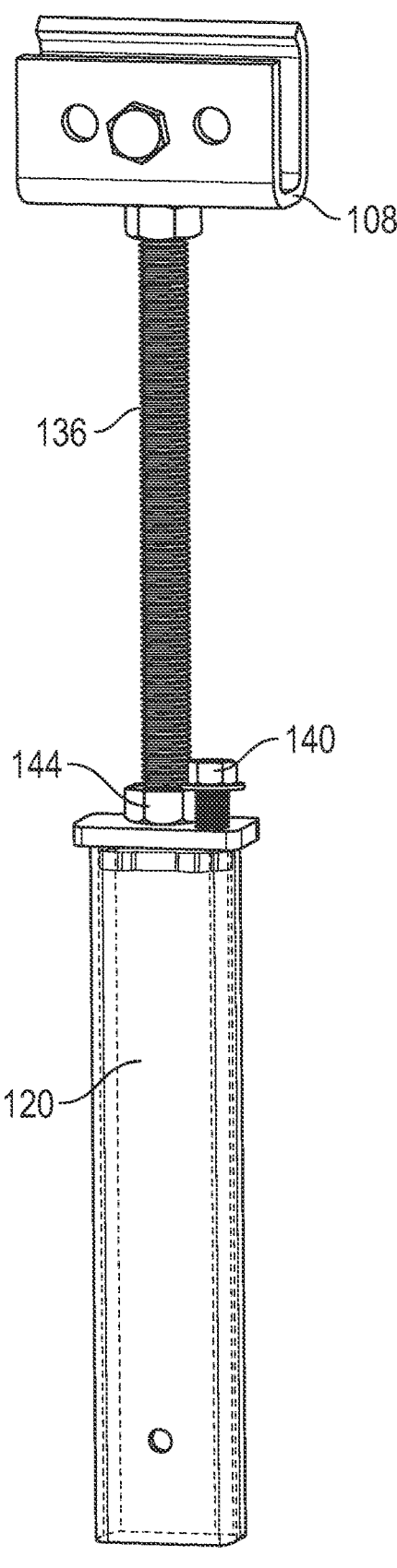
FIGS. 3 through 5 are perspective views of portions of the rooftop support structure of FIG. 2, with a post of the rooftop support structure shown transparent in FIGS. 4 and 5.

The telescoping rod 136 may be threaded, so that the height of the telescoping rod 136 may be adjusted by sliding movement of the rod 136 and rotational adjustment of a locking nut 144. For example, from the retracted configuration shown in FIG. 2, the telescoping rod 136 can be slid to an extended orientation as shown in FIG. 3. As also shown in FIG. 3, the locking nut 144 can then be moved (via rotation) along the telescoping rod 136 to be seated on the upper plate of the post 120. Thus located, the locking nut 144 can block any sliding retraction of the telescoping rod 136 while still allowing rotational adjustment in some cases (e.g., to properly orient the clamp 108). With the locking nut 144 in place and the telescoping rod 136 at a desired extension, the locking fastener 140 can then be tightened to secure the locking nut 144 against further rotation and lifting—and, correspondingly, prevent lifting of the telescoping rod 136.

Figures 4, 5:
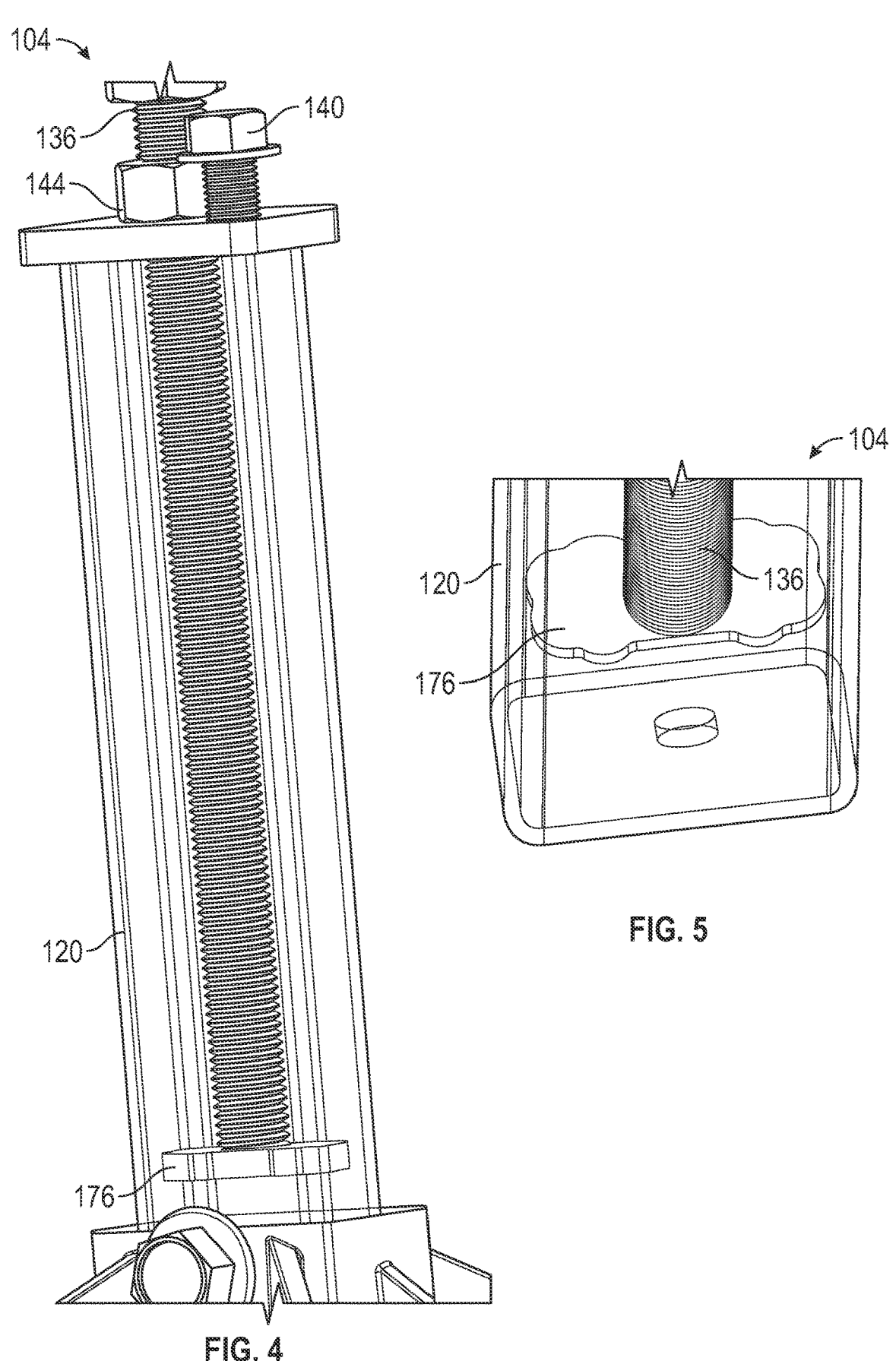

In some cases, internal structures can also help to prevent undesired rotation of a clamp supported by a telescoping assembly (e.g., the telescoping rod 136, or other known telescoping support structures). For example, as shown through the post 120 as transparently rendered FIGS. 4 and 5, the bottom of the telescoping rod 136 is coupled to a plate 176 that has a narrowed center portion that is non-rotationally secured to the telescoping rod 136 and widened opposing side portions that extend to be disposed at opposing sides of the post. This general shape can allow the plate 176 to contact each face of the inner surface of the post 120 to prevent rotation of the telescoping rod 136 or, in some cases, to slide along the internal corners of the post 120. In particular, the illustrated profile of the plate 176 includes the opposing side portions that each include one or more lobes. Each of the lobes may include a rounded profile that projects outward from one of the side portions of the plate 176. Though each of the side portions of the plate 176 are illustrated as having four lobes, it is contemplated that the side portions may instead have, 2 or 3 lobes. The lobes of the plate 176 may be configured to contact the sides of the post 120 to prevent rotation of the telescoping rod. Thus, the plate 176 may prevent unwanted adjustments to the height of the telescoping rod 136 by preventing the telescoping rod 136 from turning and thereby changing extension height relative to the locking nut 144. The illustrated lobed shape of the plate 176 may be advantageous over a rectangular shaped plate, as the lobes of the plate 176 provide points of contact against the sides of the post 120 while reducing the amount of material needed when manufacturing the plate 176.

An end of the telescoping rod 136 extends upward and is coupled to the clamp 108, so that the rod 136 supports the clamp 108 relative to the base 116. The clamp 108 may be threadedly coupled to the telescoping rod 136 in some configurations, or can be secured using other known approaches for fixed or rotational connection between support structures.

Figure 6:
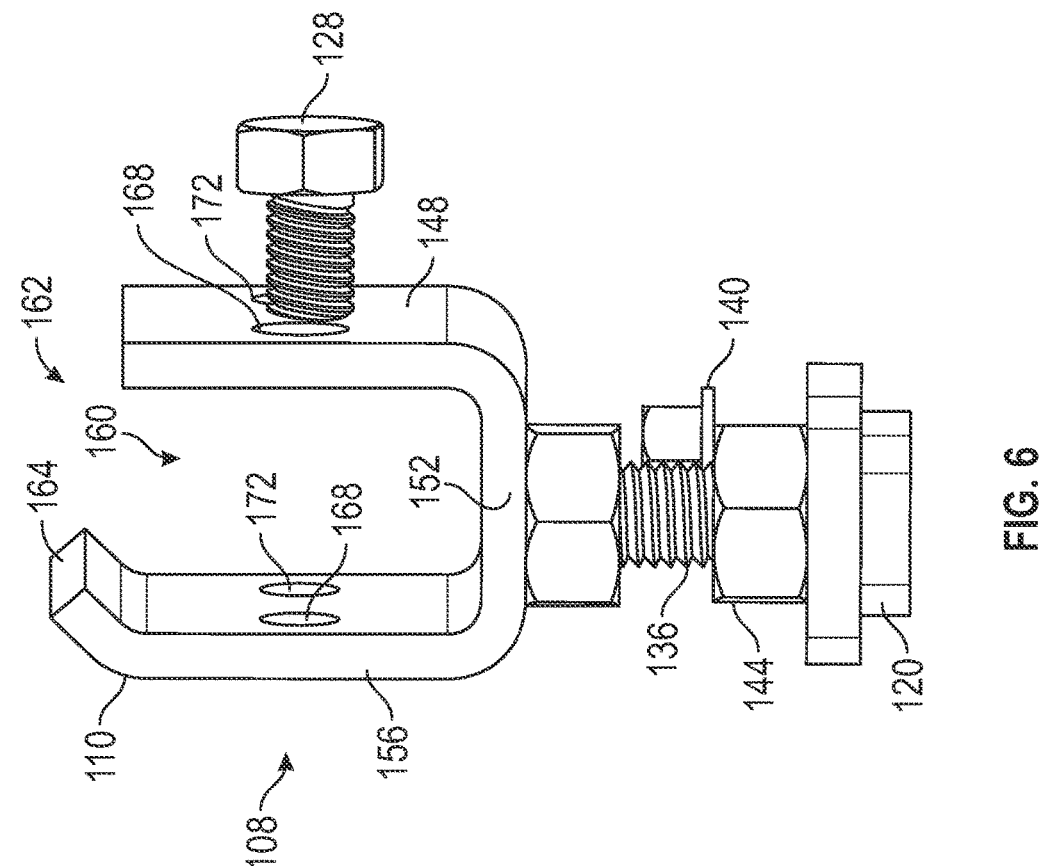
FIG. 6 is a perspective view of a clamp portion of the rooftop support structure of FIG. 2.

FIG. 6 depicts an enlarged view of the clamp 108 from the depiction of the support structure 104 in FIG. 2. Generally, clamps according to the disclosed technology can include an open interior profile, as can allow sliding adjustment along an elongate direction of a clamped beam, and can also include a restricted entrance area relative to the size of the interior profile, as can help to prevent a clamped beam from being easily lifted (or falling) out of the clamp.

In the illustrated example, the clamp 108 has a U-shaped body 110 that includes a first wall 148, a second wall 152 extending from the first wall 148, and a third wall 156 extending from the second wall 152, so that the first wall 148, the second wall 152, and the third wall 156 partly define an interior volume 160 of the clamp. A tab 164 extends from the third wall 156 at least partly toward the first wall 148 to further define the interior volume 160 (e.g., extending at an angle $\alpha$ of about 135 degrees in the example shown, or at an angle in a range between about 125 degrees and about 145 degrees to optimally balance retention with ease of installation, in some examples).

The first wall 148 may include a threaded opening to receive the threaded fastener 128. Tightening the threaded fastener 128 may urge a beam (e.g., one of the beams 112) away from the first wall 148 to effectively decrease the portion of the interior volume 160 that can receive the beam. With sufficient tightening, the fastener 128 can thus hold the beam against the third wall 156 (e.g., with the beam seated directly on the third wall 156). Although a threaded fastener is shown, some examples can include slidable fasteners or other known securing structures to engage with a beam similarly to a threaded fastener as detailed herein.

In this regard, the tab 164 may further help to retain a beam within the interior volume 160 of the clamp 108. In particular, the tab 164 extends to define a reduced-clearance entrance region into the interior volume 160 (i.e., an entrance region 162 that exhibits a smaller cross-sectional area to receive a beam than does a main (clamping) portion of the interior volume 160). In other words, for example, the tab 164 can define a minimum clearance dimension for the clamp 108, so that a corresponding beam can be slid into the interior volume 160 through the entrance region 162 and then be exposed to greater clearance for lateral movement once fully through the entrance region 162 and within the interior volume 160. The tab 164 can correspondingly prevent a beam from exiting the interior volume 160 by contacting a sidewall of the beam 112, as further discussed below.

The clamp 108 may optionally include a first set of aligned openings 168 and a second set of aligned openings 172 that are spaced apart from the first set of aligned openings (e.g., along an elongate direction of a beam received in the clamp 108). The first set of aligned openings 168 and second set of aligned openings 172 may be configured to receive fasteners to secure multiple beams within the same clamp 108. The first and second set of aligned openings 168 and 172, may be configured to receive threaded fasteners in some configurations. In other configurations, the first and second set of aligned openings 168 and 172 may be configured to receive pin fasteners. As illustrated, the first and second set of aligned openings 168 and 172 are round, however the first and second set of aligned openings 168 and 172 may be configured to receive beam-fasteners 124 with various cross sections profiles (e.g., rectangular or oblong). In some cases, the openings 168 or 172 can be used on only side of the clamp 108 (e.g., with a first fastener through one of the openings 168 and a second fastener through one of the openings 172 to secure respective beams in cooperation with the tab 164 (e.g., as generally discussed above).

As illustrated, the interior volume 160 of the clamp 108 is configured to receive the beam 112 with a rounded rectangular cross section. However, in other configurations, the interior volume 160 may be configured to receive beams 112 having other cross-sectional profiles (e.g. oblong, rectangular, ovular, or trapezoidal).

Figure 7A:
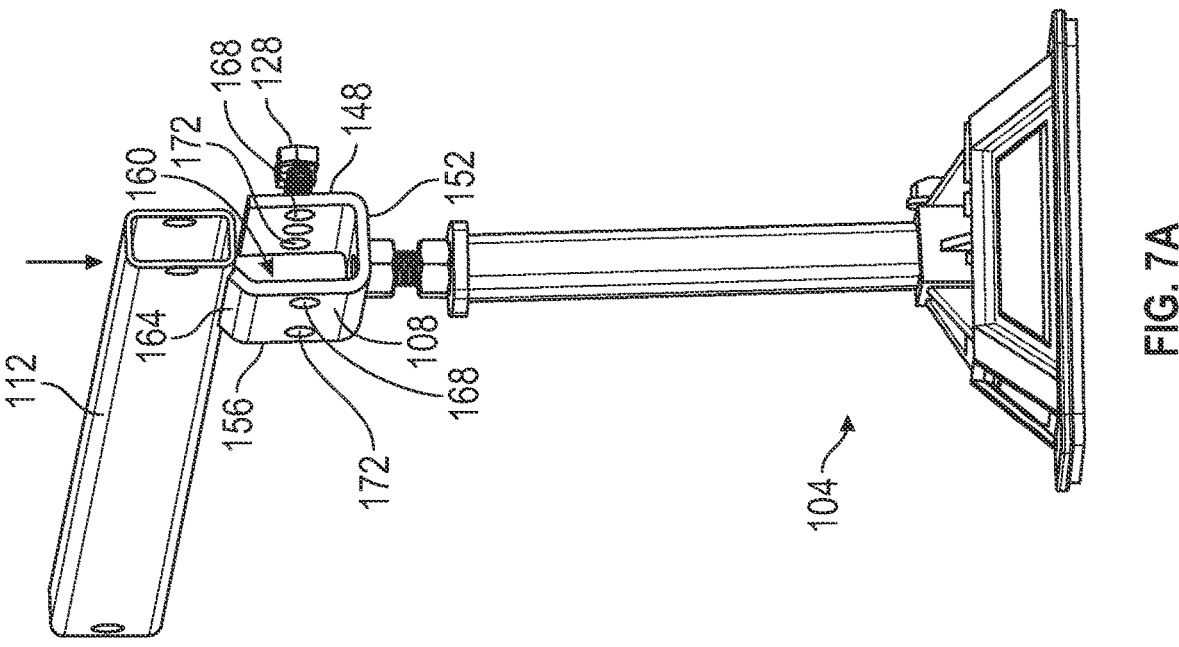
FIG. 7A-7C depict a process of securing a beam with a clamp of the equipment support frame of FIG. 1.
Figures 7B, 7C:
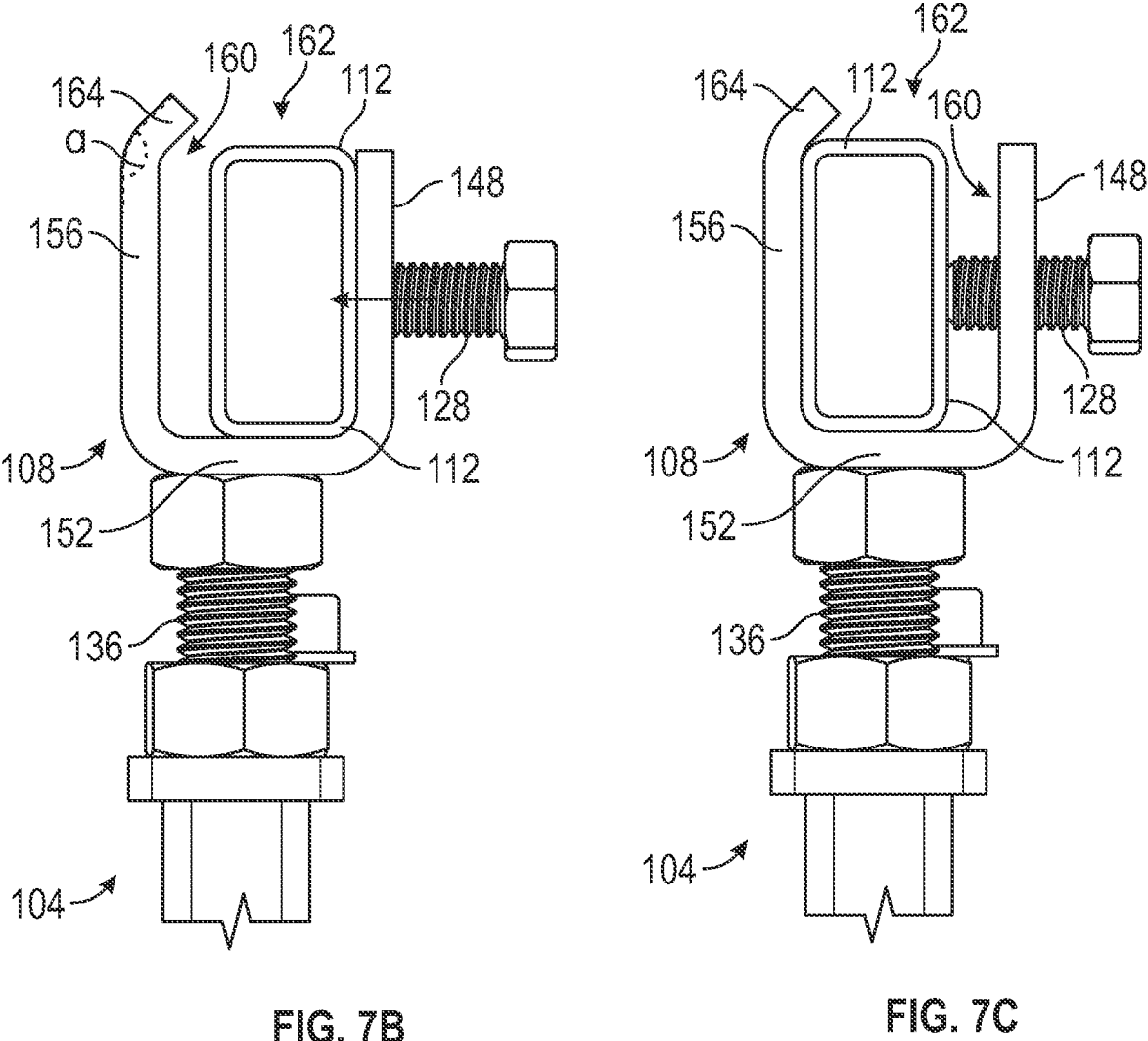

FIGS. 7A-7C illustrate example operations to assemble a modular sub-assembly of the support system 100 into customized configurations. The beam 112 can be slidably received into the interior volume 160 of the clamp 108 (e.g., moving transversely relative to the elongate direction of the beam 112). The beam 112 can then be urged toward and, eventually, secured against the third wall 156 of the clamp 108 using the threaded fastener 128 (e.g., urged by the fastener 128 to be seated directly on the third wall 156). As the fastener 128 moves the beam 112 toward the third wall 156, the beam 112 can be correspondingly moved out of alignment with the entrance region 162 of the clamp 108. Accordingly, the tab 164 can block removal of the beam 112 from the interior volume 160, in combination with the effective reduction in width of the interior volume 160 provided by the fastener 128.

In a fully clamped configuration, as shown in FIG. 7C, the tab 164 can extend over the top of the beam 112, with the beam 112 clamped against the third wall 156 by the fastener 128 (e.g., can extend only partly across the beam 112 as shown, on an opposite side of the beam 112 from the second wall 152). The tab 164 can accordingly permit transverse insertion of the beam 112 into the interior volume 160 and can also, cooperatively with the fastener 128, the second wall 152, and the third wall 156, help to securely retain the beam 112 within the interior volume 160 (e.g., with the beam 112 seated directly against the second wall 152 and supported thereby relative to gravity, as shown).

In some cases, the beam may be optionally further secured by additional fasteners. For example fasteners inserted through the aligned openings 168, 172 (see, e.g., FIG. 6, fasteners not shown) can optionally further secure the beam 112 in the interior volume 160 of the clamp 108. Thus, as noted above, one or more fasteners can be used to secure one or multiple beams in cooperation with the tab 164.

Figure 8:
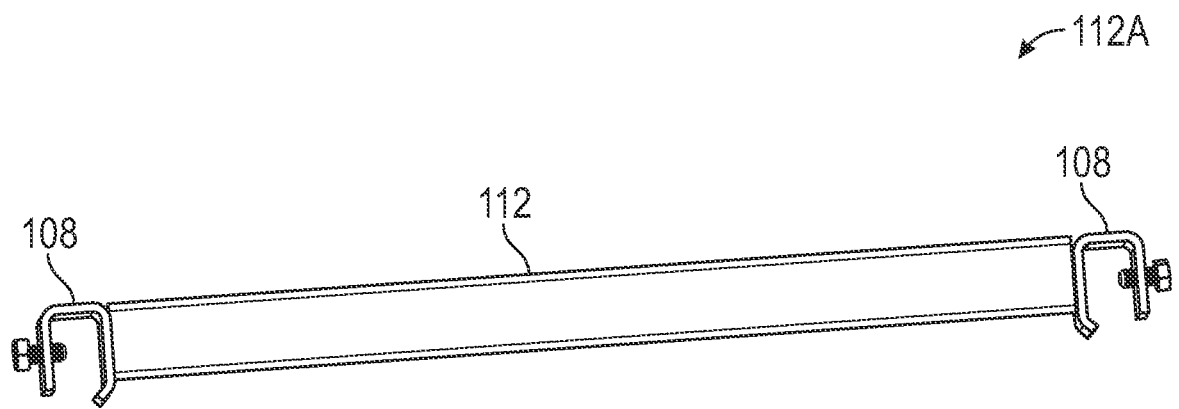
FIG. 8 is a perspective view of a crossbeam assembly of the equipment support frame of FIG. 1.

In some examples, one or more clamps according to the disclosed technology (e.g., substantially identical instances of the clamp 108) can be secured to other structures to provide useful sub-assemblies. Relative to the modular support system 100, for example, FIG. 8 depicts a configuration of the crossbeam sub-assembly 112A that includes one of the beams 112, with one of the clamps 108 coupled to either opposing end of the beam 112. The clamps 108 can be rigidly or otherwise coupled to the beam 112 (e.g., with pins or welds) and may be configured to receive another of the plurality of beams 112 (see FIG. 1) as generally described above.

Thus, for example, the crossbeam sub-assembly 112A can be easily lifted into place and then simultaneously (or sequentially) secured to multiple beams of other sub-assemblies of a modular support system. Correspondingly, the inclusion of the clamps 108 on the sub-assembly 112A can help to streamline installation and customization of support structures. This may be particularly true in view of the ability to slide the clamps 108 along other beams while the corresponding fasteners 128 are not fully tightened, as also noted above. For example, users may lift the sub-assembly 112A into place to be supported relative to gravity by existing support system structures and then slidably adjust a position of the clamps 108 and anything attached (or attachable) thereto relative to those existing structures. In this regard, for example, referring also to FIGS. 1 and 12, two of the sub-assemblies 112A can provide an adjustable mounting structure to support an air conditioner or other load.

In the illustrated example, the clamps 108 are coupled to the beam 112 such that the tab 164 faces downward when the clamp 108 is secured to another of the plurality of beams 112. Further, the entrance regions of each of the clamps 108 is oriented to receive a beam in a similar direction (e.g., due to bulk translation of the sub-assembly 112A toward the beams to be engaged). In other examples, however, the clamps 108 can be similarly secured to a beam or other common structure but can have different relative rotational orientations.

Further, in the illustrated example, the clamps 108 extend from and outwardly past the opposed ends of the beam 112. In other examples, the clamps 108 can be secured to the beam 112 at other locations or in other relative orientations (e.g., at other locations along end regions of the beam 112).

Figures 12, 13:
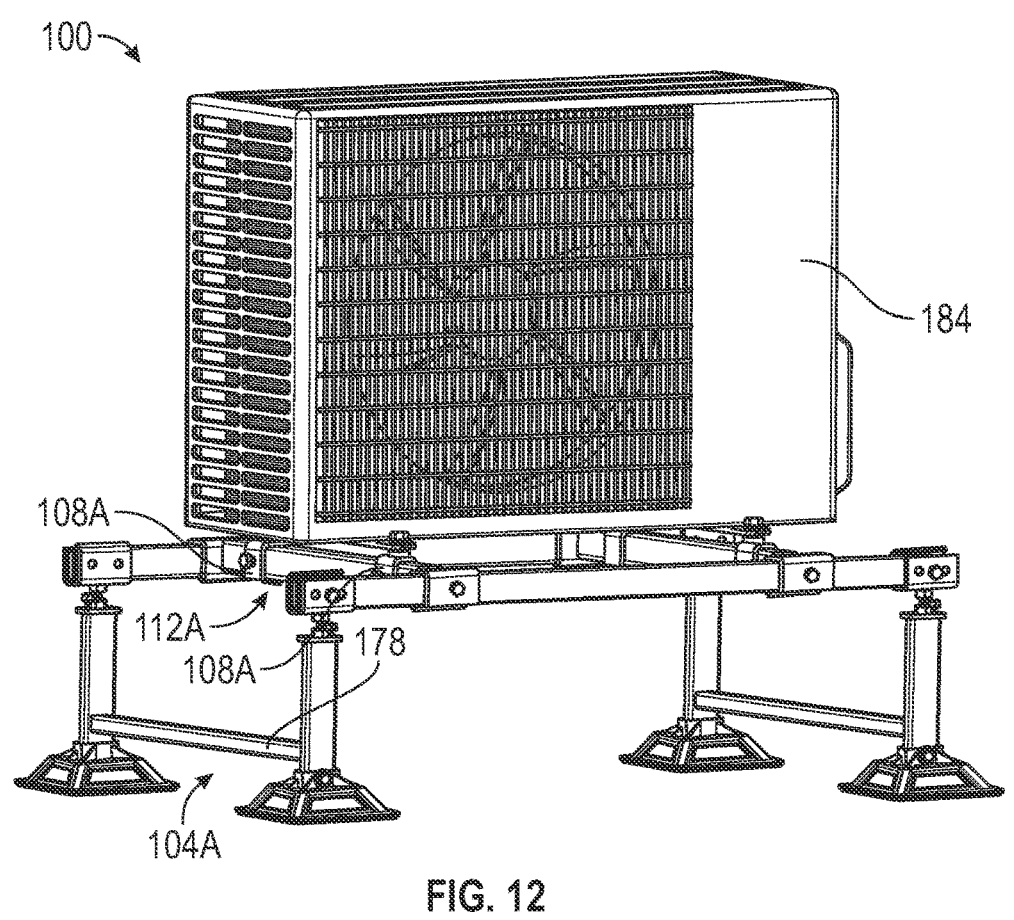
FIG. 12 is a perspective view of the modular rooftop support structure of FIG. 1 installed to support an air conditioner.
FIG. 13 is a perspective view of a clamp of the rooftop support structure of FIG. 1 in a mounting assembly for the air conditioner of FIG. 12.

Referring to FIGS. 1 and 12, in some embodiments, two of the support structures 104 may be coupled by a spacer beam 178 to form a support structure subassembly 104A. The spacer beam 178 may provide further stability to the support system 100. The spacer beam 178 may also provide an automatic spacing between the support structures 104 of the support structure subassembly 104A, to increase speed and ease of installation. The automatic spacing of the support structure subassembly 104A, as provided by the spacer beam 178, may reduce the amount of time spent on the adjustment of a distance between the support structures 104 of the support structure subassembly 104A, when installing the crossbeam subassembly 112A. In some embodiments, the automatic spacing may be due to the spacer beam 178 being a length that is the same or similar to a length of the crossbeam in the crossbeam subassembly 112A.

In some embodiments, the spacer beam 178 may permanently couple the support structures 104 of the support structure subassembly 104A (e.g., via welding). In some embodiments, the spacer beam 178 may rather secure the support structures 104 via other fastening mechanisms (e.g., via threaded fasteners, the clamps 108, or other fastening techniques). In some embodiments, the support system 100 may include more than one of the support structure subassemblies 104A. In some embodiments, none of the support structures 104 may be coupled by the spacer beam 178, or the spacer beam 178 can couple other support structures (e.g., not the support structures 104).

Figure 9:
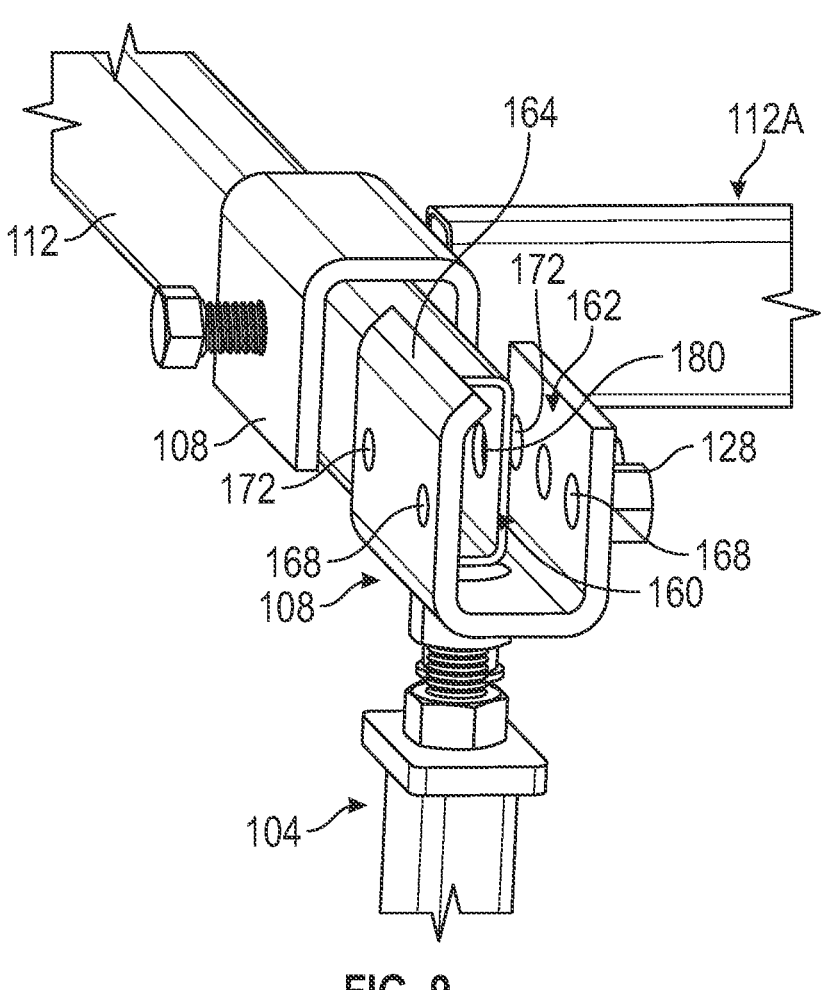
FIGS. 9-10 depict operations to secure multiple beams together for the equipment support frame of FIG. 1 according to embodiment processes of the invention.

As also noted above, some configurations of the clamps 108 can be used to connect together multiple beams. In this regard, for example, FIG. 9 depicts an enlarged view of a portion of the support system 100, including one of the support structures 104. As shown in FIG. 9, the clamp 108 on the support structure 104 includes the aligned openings 168, 172, and the beam 112 includes a corresponding opening that can be aligned with either of the sets of openings 168, 172 depending on the translational position of the beam 112 along the clamp 108.

Figure 10:
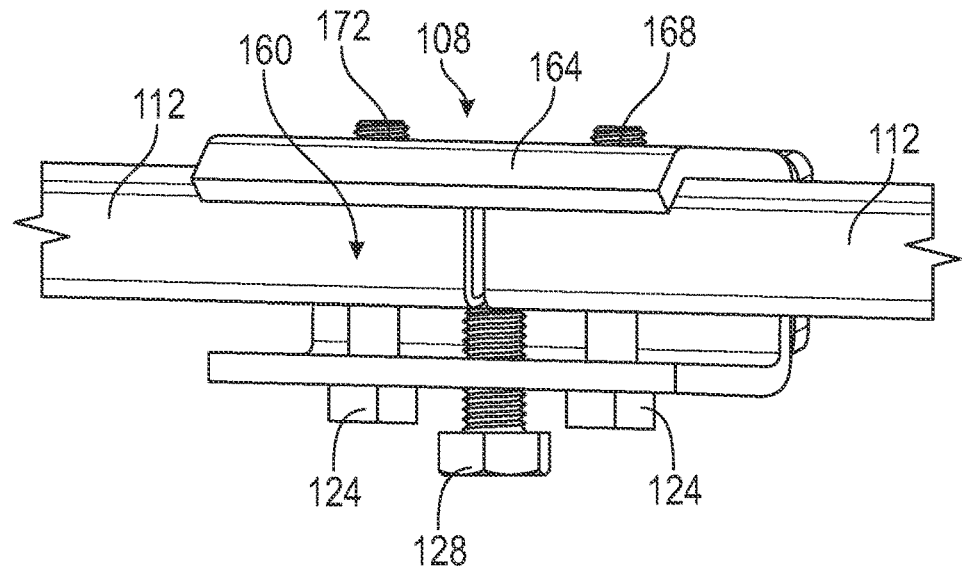
Figure 11:
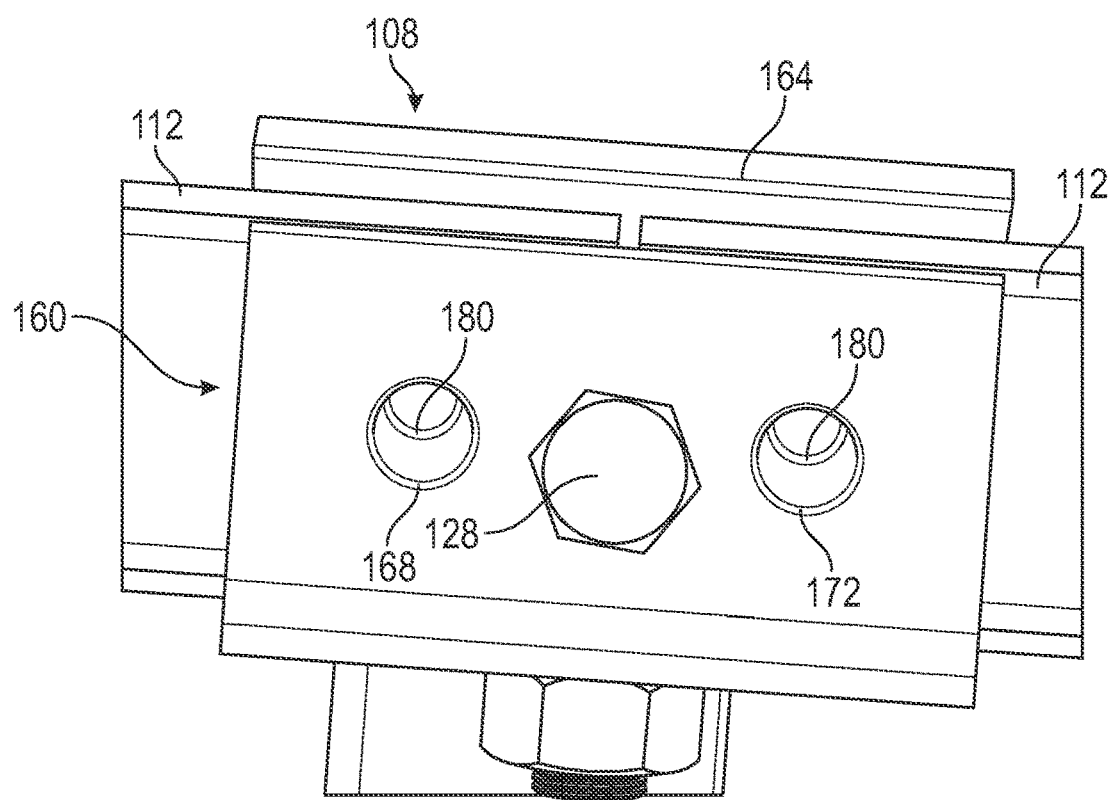
FIG. 11 depicts another configuration to secure multiple beams together for the equipment support frame of FIG. 1 according to embodiment processes of the invention.
Figure 15:
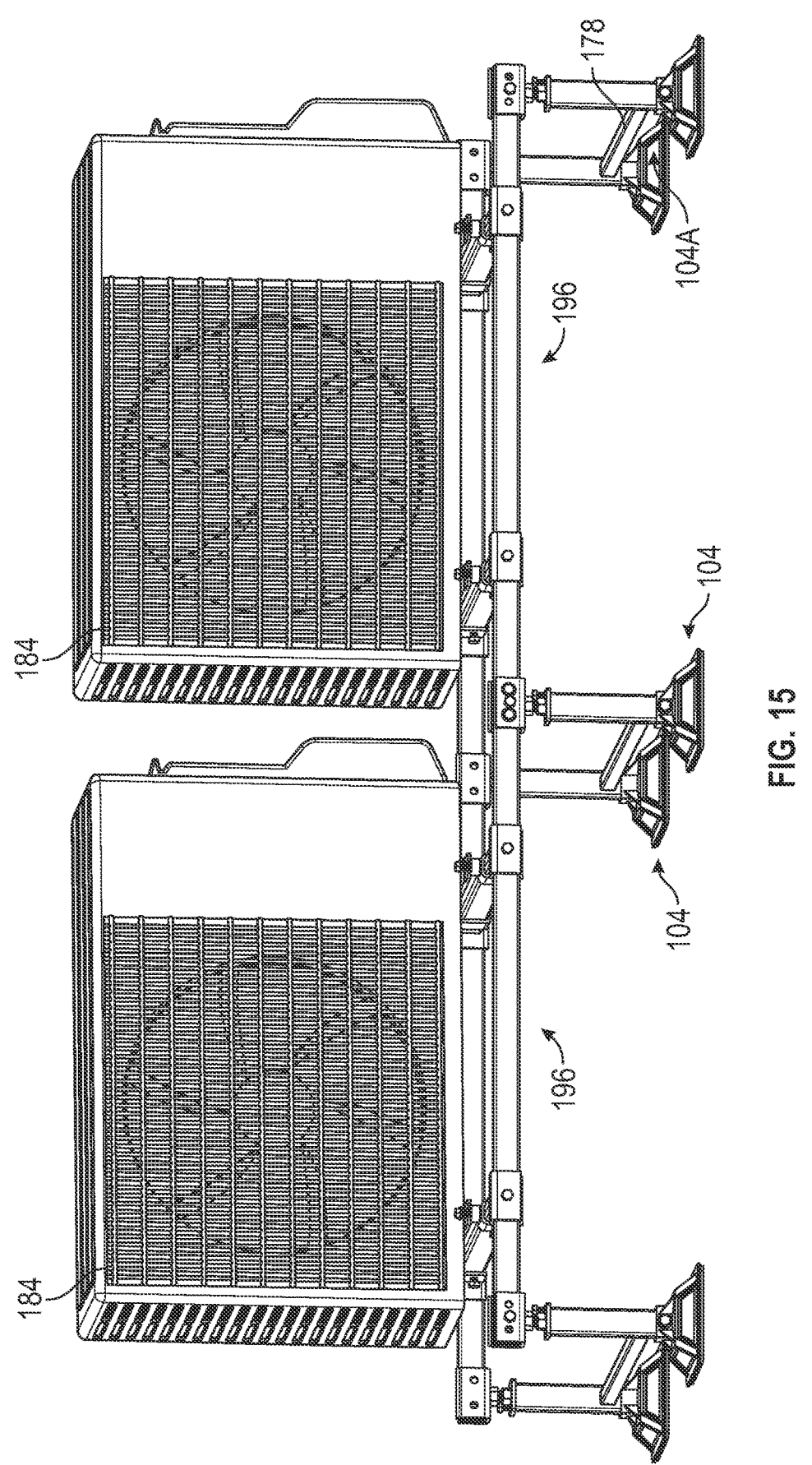
FIG. 15 is a perspective view of a ganged configuration of the rooftop support structure of FIG. 1, using multiple instances of the sub-module of FIG. 14.

As shown in FIGS. 10 and 11, the support system 100 can be arranged so that a clamp (e.g., the clamp 108 as shown in FIG. 10) can secure two of the beams 112 together. In particular, FIG. 10 illustrates the clamp 108 receiving fasteners 124 through the first and second sets of aligned opening 168 and 172. The fasteners 124 also extend through aligned sets of beam fastener apertures 180 on the beams 112 (see also FIG. 9), helping to secure both beams 112 within the interior volume 160 of the clamp 108 and thereby allowing for a modular extension of the support system 100 beyond the support structure 104. The clamp 108 can thus allow the support system 100 to be extended to include more than the four support structures 104 shown in FIGS. 1 and 12. Indeed, the ability of the clamp 108 to easily secure more than one beam 112 can allow the equipment support frame to include any number of support structures 104 and any number of beams 112 which may be utilized to either support large equipment, or multiple equipment units on the same frame (e.g., as shown in FIG. 15).

In some cases, with the beams 112 thus arranged, the threaded fastener 128 may be used to secure both beams 112 within the clamp 108 in cooperation with the tab 164 (see, e.g., FIG. 10). In some cases, fewer (or different) fasteners can be used to secure multiple beams within a clamp. For example, FIG. 11 illustrates the clamp 108 securing two beams 112 by only utilizing the threaded fastener 128 to hold the beams 112 against the third wall 156 of the clamp 108, under the tab 164. In some cases, beams can be secured within one or more of the clamps in an overlapping (lapped) configuration. In some cases, as also noted above, threaded fasteners can be engaged with the openings 168, 172 on one side of the clamp 108 to urge a beam into clamped engagement in alignment with the tab 164.

FIG. 12 depicts the support system 100 supporting equipment 184. In particular, the equipment 184 is coupled to and supported by a plurality of the clamps 108 that are included in support clamp mounting assemblies 108A. In a preferred embodiment, the equipment 184 is an air conditioning unit. In other embodiments, the equipment 184 may be any component or assembly that may need to be held aloft, including other rooftop equipment as discussed above.

FIG. 13 depicts an example configuration of the support clamp mounting assembly 108A, which includes the body 110 of the clamp 108 and the fastener 128, as generally described above, with the body 110 also coupled to a support rod 188 and a cushioning washer 192. The support rod 188 may extend proud of the body 110 and may generally be configured to couple the clamp 108 to various equipment. Thus, for example, the support rod 188 may be threaded so as to be easily secured to a mounting bracket of the equipment 184 (e.g., with an included nut as shown) or other mounting structure. In other examples, other configurations are possible to allow the support rod to be coupled to equipment, including known types of fasteners and bracketry. In some embodiments, the cushioning washer 192 may be made from natural or synthetic rubber or other suitable elastomers. Such a configuration may help to reduce the transfer of vibrations from the equipment 184 to the support system 100 and otherwise cushion or isolate the equipment 184 during installation and operation. In another configuration, a support clamp may not include the cushioning washer 192 or may include bearing structures of other configurations.

Returning to FIG. 12, the clamps 108 of the mounting assemblies 108A as coupled to the equipment 184 may be slidably received by the plurality of beams 112 on the support system 100 (e.g., onto the crossbeam sub-assemblies 112A, as shown). The equipment 184 as secured by the clamps can therefore be slidably adjusted (e.g., along the sub-assemblies 112A, as shown) and then fully secured in a final position by tightening the threaded fastener 128 to secure the corresponding beam 112 in cooperation with the tab 164.

Figure 14:
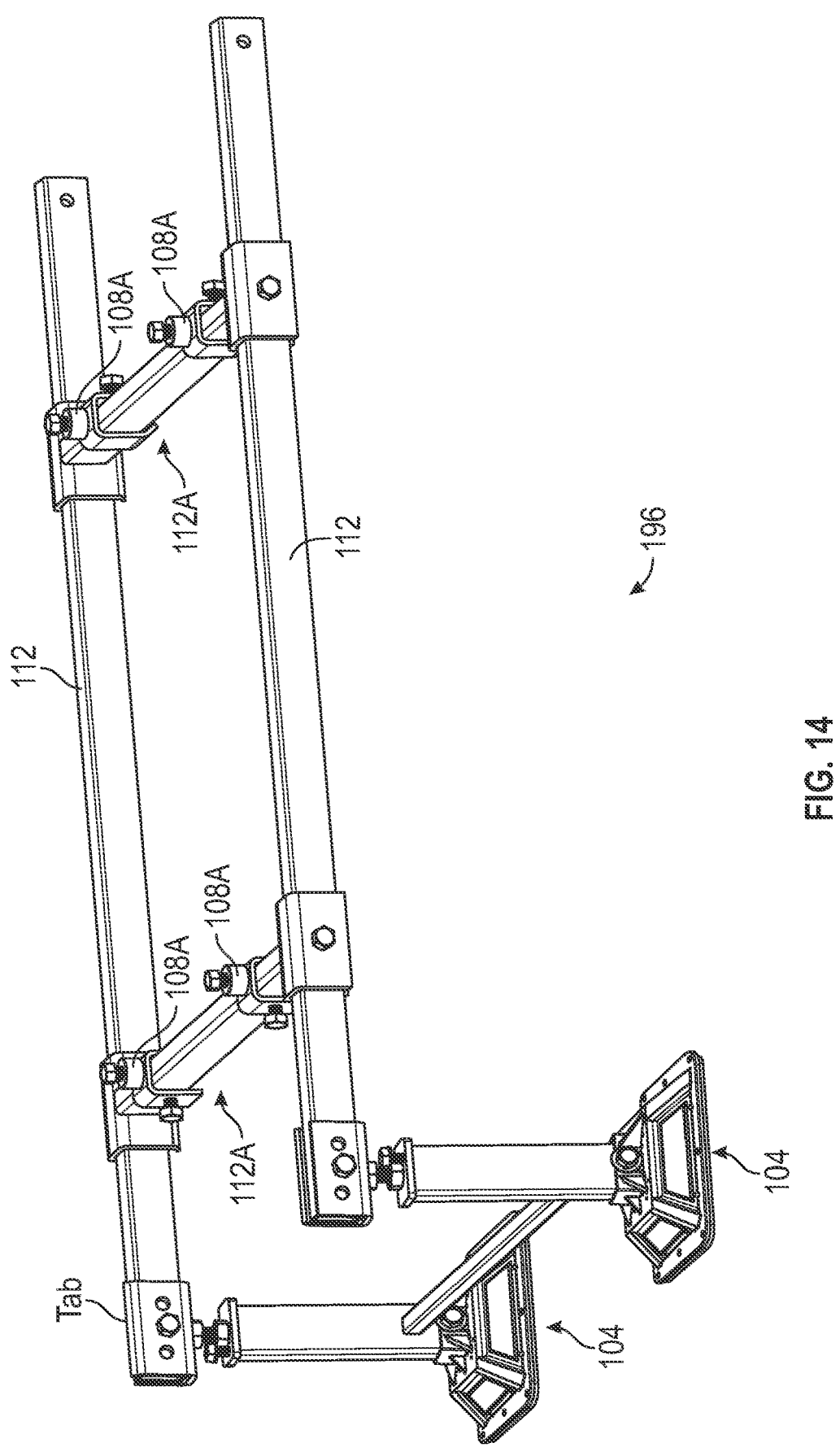
FIG. 14 is a perspective view of a sub-module of the equipment support frame of FIG. 1 for ganged configurations of the rooftop support structure.

As noted above, the support system 100 is modular and thus easily extendable, as facilitated in particular by the versatility of the clamp 108. In this regard, for example, FIG. 14 depicts a kit sub-assembly 196 for gangability (i.e., the ability to be installed over an extended length for support of larger or multiple pieces of equipment, using successive modular sub-assemblies). The sub-assembly 196 may be used as a sub-assembly for the support system 100, for example, to allow the support system 100 to be extended to span larger distances (e.g., to support more equipment or include additional pedestal support structures).

In the illustrated example, the sub-assembly 196 includes two of the rooftop support structures 104 and a plurality of the beams 112, including as part of the sub-assemblies 112A (with the mounting assemblies 108A). Because the clamp 108 can receive more than one beam 112, the sub-assembly 196 or portions of the sub-assembly 196 can be added to either end of the configuration of the support system 100 as depicted in FIG. 1 (or other sub-assemblies of components of the support system, in other arrangements). For example, as shown in FIG. 14, the beams 112 in the sub-assembly 196 include an unclamped end, opposite the end coupled to and supported by the two support structures 104. The unclamped end of the beams 112 may be inserted and fastened into the clamps 108 at either end of the arrangement of the support system 100 shown in FIG. 1, for example, to substantially extend a footprint of the support system 100 overall. The addition of one sub-assembly 196 to the support system 100 may thus allow the support system 100 to support larger machinery or may allow the support system 100 to support multiple pieces of equipment (e.g., multiple air conditioners). More than one of the sub-assemblies 196 (or portions thereof) may be added to various configurations of the support system 100, to accommodate as many of the pieces of the equipment 184 as may be practically desired.

FIG. 15 illustrates two of the sub-assemblies 196 from FIG. 14 in combination with two additional support structures 104 (e.g., as another of the support subassemblies 104A) to provide an extended configuration of the support system 100. The combinations of the sub-assembly 196 can accordingly allow the support system 100 to accommodate more equipment (e.g., two air conditioners 184, as shown). Thus, using the sub-assemblies 196 or other arrangements, the support system 100 may support any number of pieces of equipment. For example, multiple of the sub-assemblies 196, may be added to either end of the arrangement shown in FIG. 15, by coupling the unclamped ends of the beams 112 in adjacent sub-assemblies 196 with a common clamp 108 (e.g., on a common support structure 104, as shown), to create an increasingly elongated configuration.

Figure 16:
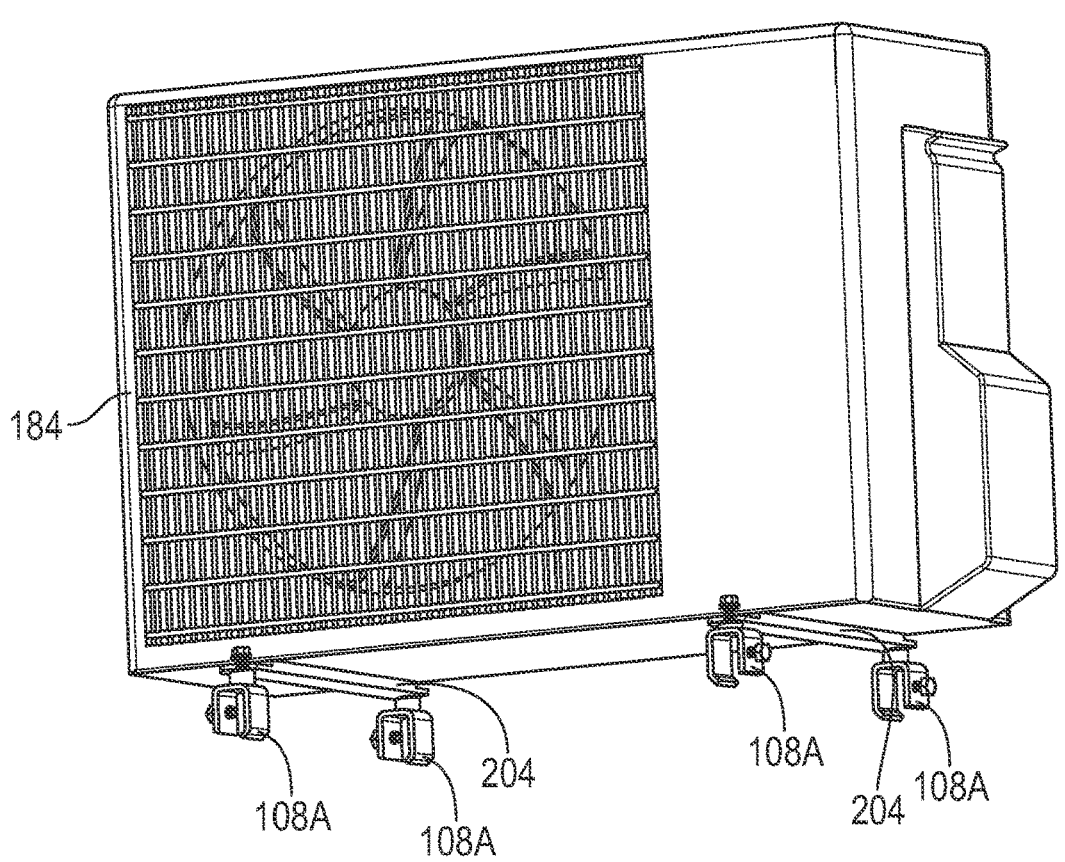
FIGS. 16 and 17 are perspective views of air conditioner sub-modules with the air conditioner of FIG. 13 and multiple of the clamps of FIG. 1, pre-configured for installation on support beams of the modular equipment support frame of FIG. 1.
Figure 17:
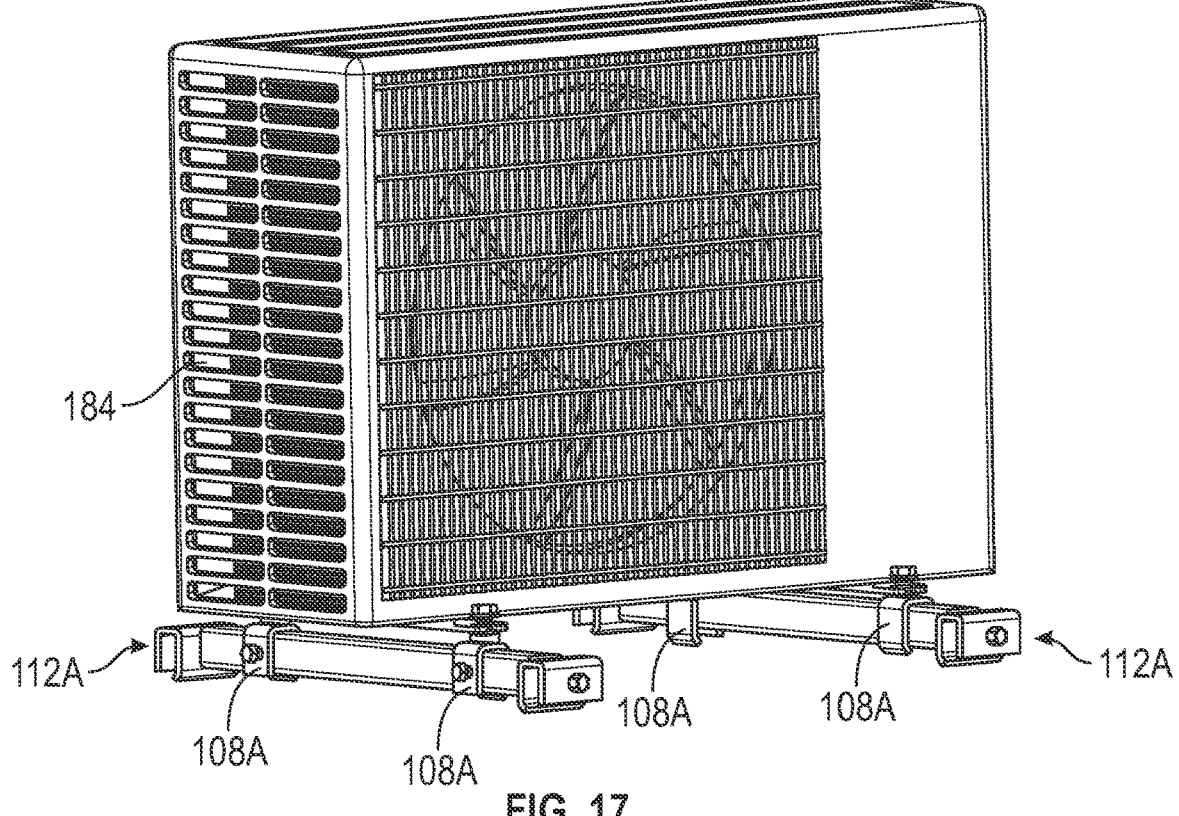

As generally noted above, some modular assemblies according to the disclosed technology can facilitate easier mounting of heavy equipment. For example, FIGS. 16 and 17 depict the equipment 184 coupled to respective mounting assemblies that include a plurality of the clamp mounting assemblies 108A. The clamps 108 coupled to the equipment 184 may not include the first and second set of aligned openings 168 and 172 in some examples (e.g., as shown). The mounting assembly for the equipment 184 may include a bar 204, coupled to the bottom of the equipment 184, and the support rods 188 of the mounting assemblies 108A may be coupled to the bar 204 (or the clamps 108 can be otherwise secured thereto). In some examples, the support rod 188 may be threadedly coupled to the bar 204. In another configuration, the support rod 188 may be coupled to the bar 204 using a pin.

As illustrated in FIGS. 16 and 17, the support clamps 108 of the mounting assemblies 108A can be coupled to the equipment 184 prior to the installation of the piece of equipment (e.g., on the support system 100 as shown in FIG. 1, 12 or 15). In some cases, the support clamps 108 (or other clamps) can be coupled to the equipment 184 and clamped to corresponding beams 112 (e.g., of the crossbeam subassembly 112A, as shown), before being staged on and then secured to another part of the support system 100. Further, in some cases, the support clamps 108 can be adjustably secured in place on the support system 100, and then the equipment 184 can be thereafter arranged on and coupled to the mounting assemblies 108A.

Thus, examples of the disclosed technology can provide improved support systems for supporting equipment above rooftops or other support surfaces. For example, use of a clamp as detailed above, along with various associated sub-assemblies, can allow for easy and adaptable modular assembly of a variety of support structure configurations to support a variety of types and arrangements of equipment.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical direction for a relevant reference frame.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, "integral" and derivatives thereof (e.g., "integrally")

describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A rooftop support system comprising:
a rooftop support structure that includes:
  a support beam;
  a base to support the rooftop support structure on a rooftop;
  a post secured to and extending upwardly from the base; and
  a clamp secured to the post to be supported by the post relative to the base, the clamp including:
  a first wall;
  a second wall extending from the first wall;
  a third wall extending from the second wall, so that the first, second, and third walls partly define an interior volume of the clamp to receive the support beam with the first wall of the clamp below the support beam; and
  a tab extending from the third wall at least partly toward the first wall to further define the interior volume and retain the support beam within the interior volume; and
a second clamp engaged with the support beam, the second clamp including:
  a second-clamp first wall;
  a second-clamp second wall extending from the second-clamp first wall;
  a second-clamp third wall extending from the second-clamp second wall;
  a second-clamp tab that extends from the second-clamp third wall so that the second-clamp first, second, and third walls and the second-clamp tab define a second-clamp interior volume; and
  a support post extending upwardly from the second-clamp second wall, with the second-clamp second wall seated above the beam, to secure a supported load to the beam.

2. The rooftop support system of claim 1, wherein the tab extends from the third wall to define a reduced-clearance entrance region of the interior volume.

3. The rooftop support system of claim 2, wherein the third wall is spaced from the first wall by a first distance in a first direction; and
wherein the tab extends from the third wall to define a second distance from first wall in the first direction, at the reduced-clearance entrance region, the second distance being smaller than the first distance.

4. The rooftop support system of claim 1, wherein the first and third walls include a first set of aligned openings and a second set of aligned openings spaced apart from the first set of aligned openings; and
wherein the rooftop support system includes a first beam secured at the first set of aligned openings and a second beam secured at the second set of aligned openings.

5. The rooftop support system of claim 1, wherein the support beam is received in the interior volume of the clamp and the tab retains the support beam in the interior volume of the clamp; and
wherein a threaded fastener extends through a threaded opening in the first wall of the clamp into the interior volume to clamp the beam into the third wall adjacent to the tab.

6. The rooftop support system of claim 1, further comprising a crossbeam assembly that includes:
a crossbeam with a first end and a second end opposite from the first end in an elongate direction of the crossbeam;
a first cross-beam clamp secured to the first end;
a second cross-beam clamp secured to the second end;
wherein each of the first cross-beam clamp and the second cross-beam clamp include, respectively:
  a first wall;
  a second wall extending from the first wall;
  a third wall extending from the second wall, so that the first, second, and third walls partly define an interior volume of the first or second clamp, respectively; and
  a tab extending from the third wall at least partly toward the first wall to further define the interior volume;
the second wall of the first cross-beam clamp being seated on a first beam of the rooftop support system and the second wall of the second cross-beam clamp being seated on a second beam of the of the rooftop support to collectively support the crossbeam.

7. The rooftop support system of claim 1, wherein the rooftop support system is a modular support system that includes:
a plurality of clamps that are substantially identical to each other and include the clamp of the rooftop support structure, each clamp of the plurality of clamps including a U-shaped cross-sectional profile that at least partly defines an interior volume, a tab extending from a side wall of the U-shaped cross-sectional profile to define a narrowed entrance region into the interior volume, and a threaded fastener threadedly secured to the clamp to be adjustably extendable into the interior volume;
a plurality of cross-members, each cross-member of the plurality of cross-members having a cross-sectional profile perpendicular to an elongate direction of the cross-member, the cross-sectional profile being sized to be received through the entrance region in the interior volume of any of the plurality of clamps to be secured against removal by the threaded fastener and the tab.

8. The modular support system of claim 7, further comprising:
a plurality of adjustable height support structures, including the rooftop support structure, each of the plurality of adjustable height support structures including one or more corresponding clamps of the plurality of clamps.

9. A rooftop support system comprising:
a first rooftop support structure that includes a first clamp with a first inwardly extending tab;

a second rooftop support structure that includes a second clamp with a second inwardly extending tab;

a first beam received within and supported by the first clamp;

a second beam received within and supported by the second clamp; and a crossbeam assembly that includes:

a crossbeam with a first end and a second end opposite from the first end in an elongate direction of the beam;

a first crossbeam clamp secured to the first end of the crossbeam;

a second crossbeam clamp secured to the second end of the crossbeam;

each of the first crossbeam clamp and the second crossbeam clamp including, respectively:

a first wall;

a second wall extending from the first wall;

a third wall extending from the second wall, so that the first, second, and third walls partly define an interior volume of the first or second clamp, respectively; and a tab extending from the third wall at least partly toward the first wall, and past the first wall in a direction away from the second wall, to further define the interior volume.

10. The rooftop support system of claim 9, wherein for the first crossbeam clamp the first wall is opposite the third wall from the first end of the beam, and for the second crossbeam clamp the first wall is opposite the third wall from the second end of the beam.

11. The rooftop support system of claim 10, wherein for each of the first and second crossbeam clamps, respectively, the first wall includes a threaded opening that receives a threaded fastener so that the threaded fastener is disposed within the interior volume to secure a beam against the third wall.

12. The rooftop support system of claim 9, further comprising:

a third clamp engaged with the crossbeam, the third clamp including:

a first wall;

a second wall extending from the first wall and seated on the crossbeam;

a third wall extending from the second wall;

a tab that extends from a distal end of the third wall so that the first, second, and third walls and the tab define an interior volume with a reduced-clearance entrance region; and a support post that extends from the second wall to the exterior of the interior volume of the third clamp.

13. A method of installing a rooftop support system, the method comprising:

providing a rooftop support structure, including:

a base to support the rooftop support structure on a rooftop;

a post; and a clamp, the clamp including:

a first wall;

a second wall extending from the first wall;

a third wall extending from the second wall, so that the first, second, and third walls partly define an interior volume of the clamp to receive a support beam; and a tab extending from the third wall at least partly toward the first wall to further define the interior volume and retain the support beam within the interior volume;

installing the rooftop support structure, including by installing the base on the roof top with the post secured to and extending upwardly from the base and with the clamp secured to the post to be supported by the post relative to the base;

installing a beam into the interior volume of the clamp; and adjusting a fastener on the clamp so that the fastener and the tab retain the beam within the interior volume.

14. The method of claim 13, wherein adjusting the fastener urges the beam into the third wall adjacent to the tab.

15. The method of claim 14, wherein the fastener and the tab retain the beam within the interior volume with the beam seated on the second wall and the tab extending partly across the beam on an opposite side of the beam from the second wall.

16. The method of claim 13, further comprising:

telescopically adjusting a height of the clamp relative to the base to change a supported height of the beam.

17. The method of claim 13, wherein the rooftop support system is a modular support system and the clamp is a first clamp of a plurality of clamps that are substantially identical to each other, the method further comprising:

securing a plurality of beams to be supported by a plurality of rooftop support structures, with each beam of the plurality beams received, respectively, in at least one clamp of the plurality of clamps with the tab of each of the at least one clamp extending at least partly across the beam; and supporting equipment above the rooftop on the plurality of beams.

18. The method of claim 17, wherein supporting the equipment on the plurality of beams includes:

installing a preassembled crossbeam assembly that includes a first crossbeam clamp and a second crossbeam clamp of the plurality of clamps, and a crossbeam extending between the first and second crossbeam clamps, with:

the first crossbeam clamp seated on a first beam of the plurality of beams;

the second crossbeam clamp seated on a second beam of the plurality of beams; and the crossbeam extending between first and second beams; and supporting the equipment on the crossbeam assembly.

19. A modular rooftop support system comprising:

a support structure that includes:

a base to support the support structure on a support surface;

a post secured to and extending upwardly from the base;

a plurality of support members, each support member of the plurality of support members having a cross-sectional profile perpendicular to an elongate direction of the support member; and a plurality of clamps that include a first clamp secured to the post to be supported by the post relative to the base, each clamp of the plurality of clamps including:

a first wall;

a second wall;

a third wall connected to the first wall by the second wall, so that the first, second, and third walls partly define an interior volume of the clamp to receive a support beam, with the third wall on an opposite side of the interior volume from the first wall; and a tab extending from the third wall at least partly toward the first wall to define a narrowed entrance region into the interior volume, the narrowed entrance region being sized to receive the cross-sectional profile of any of the plurality of support members into the interior volume;

the first wall receiving a fastener that is adjustably extendable into the interior volume to clamp into the third wall a support member of the plurality of support members that is received into the interior volume, so that the fastener and the tab secure the received support member against removal from the interior volume through the narrowed entrance region.

20. The modular rooftop support system of claim 19, wherein for each clamp of the plurality of clamps, the fastener is a threaded fastener that is threadedly secured to the first wall to be threadedly adjustably extendable into the interior volume to clamp the received support member against the third wall.

\* \* \* \* \*